US012537124B2

(12) United States Patent
Bai

(10) Patent No.: US 12,537,124 B2
(45) Date of Patent: Jan. 27, 2026

(54) ELECTROMAGNETIC ACTUATING DEVICE AND CAMSHAFT ADJUSTER WITH AN ELECTROMAGNETIC ACTUATING DEVICE

(71) Applicant: Schaeffler Technologies AG & Co. KG, Herzogenaurach (DE)

(72) Inventor: Ye Bai, Röthenbach an der Pegnitz (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 175 days.

(21) Appl. No.: 18/024,787

(22) PCT Filed: Aug. 11, 2021

(86) PCT No.: PCT/DE2021/100683
§ 371 (c)(1),
(2) Date: Mar. 6, 2023

(87) PCT Pub. No.: WO2022/053101
PCT Pub. Date: Mar. 17, 2022

(65) Prior Publication Data

US 2023/0411059 A1 Dec. 21, 2023

(30) Foreign Application Priority Data

Sep. 8, 2020 (DE) ..................... 10 2020 123 408.2

(51) Int. Cl.
*H01F 7/08* (2006.01)
*F16C 17/02* (2006.01)
(Continued)

(52) U.S. Cl.
CPC ............. *H01F 7/081* (2013.01); *F16C 17/02* (2013.01); *F01L 2013/0052* (2013.01); *H01F 2007/085* (2013.01); *H01F 2007/163* (2013.01)

(58) Field of Classification Search
CPC ............... H01F 7/081; H01F 2007/085; H01F 2007/163; F16C 17/02; F01L 2013/0052
(Continued)

(56) References Cited

U.S. PATENT DOCUMENTS 3,035,135 A * 5/1962 Wolff ..................... H01H 51/30 335/130
3,504,315 A * 3/1970 Stanwell ............... H01F 7/1615 335/254
(Continued)

FOREIGN PATENT DOCUMENTS

DE 202007004754 U1 7/2007
DE 102008010648 A1 8/2009
(Continued)

*Primary Examiner* — Shawki S Ismail
*Assistant Examiner* — Lisa N Homza

(57) ABSTRACT

The disclosure relates to an electromagnetic actuating device for a hydraulic camshaft adjuster. The electronic actuating device includes a housing, a yoke, a pole core, an armature, and an actuating pin and a bearing unit. The actuating pin is led out of the housing by means of the bearing unit, and the bearing unit forms a press-fit connection with the housing or with a component connected to the housing. To improve the connection, the bearing unit, the housing and/or the component connected to the housing have a recess that increases the elasticity of the press-fit connection.

8 Claims, 2 Drawing Sheets

(51) Int. Cl.
*F01L 13/00* (2006.01)
*H01F 7/16* (2006.01)

(58) Field of Classification Search
USPC .......................................................... 335/220
See application file for complete search history.

(56) References Cited

U.S. PATENT DOCUMENTS

| | | | | | |
|---|---|---|---|---|---|
| 3,560,901 | A * | 2/1971 | Shizuka | H01H 50/02 | 200/295 |
| 3,886,507 | A * | 5/1975 | Johnston | H01F 7/1615 | 335/254 |
| 4,025,883 | A * | 5/1977 | Slade | H01H 89/06 | 361/115 |
| 4,064,471 | A * | 12/1977 | Schuessler | H01H 51/2281 | 335/229 |
| 4,259,653 | A * | 3/1981 | McGonigal | H01F 7/1615 | 318/120 |
| 4,533,890 | A * | 8/1985 | Patel | H01F 7/1646 | 335/229 |
| 4,893,102 | A * | 1/1990 | Bauer | H01H 50/18 | 335/194 |
| 5,087,847 | A | 2/1992 | Giesbert | | |
| 5,198,789 | A * | 3/1993 | Taylor | H01H 50/541 | 335/205 |
| 5,272,458 | A * | 12/1993 | Hoffman | H01F 7/1646 | 335/229 |
| 5,488,340 | A * | 1/1996 | Maley | F02M 51/0635 | 335/266 |
| 6,064,289 | A * | 5/2000 | Wieloch | H01H 50/546 | 335/10 |
| 6,194,984 | B1 * | 2/2001 | Kappel | H01H 50/546 | 218/155 |
| 8,487,722 | B2 * | 7/2013 | Mills | H01H 50/12 | 335/131 |
| 2008/0074215 | A1 * | 3/2008 | Zhou | H01H 1/0015 | 335/132 |
| 2013/0336606 | A1 | 12/2013 | Mitsch | | |
| 2019/0376421 | A1 * | 12/2019 | Hoppe | F01L 1/344 | |

FOREIGN PATENT DOCUMENTS

| | | | |
|---|---|---|---|
| DE | 102008037076 | A1 | 1/2010 |
| DE | 102013211816 | A1 | 12/2014 |
| DE | 102014108700 | A1 | 12/2015 |
| DE | 102014216274 | A1 | 2/2016 |
| DE | 102017106180 | A1 | 9/2018 |
| DE | 102018106365 | A1 | 9/2018 |
| DE | 102018121102 | A1 | 3/2020 |

* cited by examiner

ELECTROMAGNETIC ACTUATING DEVICE AND CAMSHAFT ADJUSTER WITH AN ELECTROMAGNETIC ACTUATING DEVICE

CROSS-REFERENCE TO RELATED APPLICATIONS

This application is the U.S. National Phase of PCT Application No. PCT/DE2021/100683 filed on Aug. 11, 2021, which claims priority to DE 10 2020 123 408.2 filed on Sep. 8, 2020, the entire disclosures of which are incorporated by reference herein.

TECHNICAL FIELD

The disclosure relates to an electromagnet for a hydraulic camshaft adjuster.

BACKGROUND

Such electromagnets are known, for example, from DE 10 2013 211 816 A1. An electromagnetic switching device is shown having a magnet armature, a yoke, a pressure pin guided in a bearing along an axis, and a bearing sleeve. The bearing sleeve accommodates the bearing and a magnet armature, wherein the bearing is pressed onto the pole core.

When the bearing unit is pressed in, it can happen that the bearing unit and the housing or the component connected to the housing do not form a secure press-fit connection. It is possible, for example, that an oversize does not allow for a press connection. However, it is also possible that the bearing unit is not held securely and the connection between the bearing unit and the housing is lost.

SUMMARY

It is the object of the disclosure to provide an electromagnet for a hydraulic camshaft adjuster, the bearing unit of which is securely connected to the housing or to a component connected to the housing.

The object is achieved by an electromagnet having the features described herein.

The bearing unit, the housing and/or the component connected to the housing have a recess that increases the elasticity of the press-fit connection. In this way, a secure press-fit connection can be implemented, thereby avoiding defective products or delays in the assembly process.

In a further development, the recess is arranged on the outer circumference of the bearing unit. The recess can be a reduction in sections of the diameter of the outer circumference.

In a further development, the recess is arranged as an opening in the region of the outer circumference. The outer diameter of the outer circumference can remain constant.

In an alternative embodiment, the recess is arranged on the inner circumference of the housing or of a component connected to the housing.

In a further development, the recess is an extension in sections of the inner diameter of the inner circumference. Alternatively, the recess is an opening in the region of the inner circumference.

In a further development, the bearing unit, the housing and/or the component connected to the housing have a number of recesses which increase the elasticity of the press-fit connection.

The object is also achieved by a camshaft adjuster with a central valve and an electromagnet in the form of one of the versions described above, in which case the actuating pin can be brought into contact with a control piston of the central valve.

An electromagnet can be designed as a switching or proportional magnet. It is controlled via pulse width modulation (PWM), in which the voltage or current, for example, changes between two values.

A housing of the electromagnet holds the components together and can also include other elements such as seals or a connector for contacting a voltage source. The housing can be made of plastic, for example with metal inserts that are overmolded with plastic.

A magnetic circuit consists of a yoke (fixed) and an armature (moving).

An actuating pin is firmly connected to the armature or rests against the armature. The actuating pin can, for example, act on the end face of a piston and control the piston.

A bearing unit serves for bearing the actuating pin and/or the armature. The bearing limits the mobility of the components in the radial direction and thus ensures that the components can be moved more safely. Wear is thus reduced. The bearing unit can consist of a bearing support and a sliding bearing sleeve. However, the actuating pin can also be guided directly by the bearing support.

A hydraulic camshaft adjuster can be used to adjust the phase position of a camshaft relative to the crankshaft. The crankshaft and camshaft are connected to each other via a traction mechanism (belt or chain). The chain wheel is attached to a stator on the camshaft side. The rotor is attached to the camshaft and guided in the stator. A chamber supplied with hydraulic medium is formed between the stator and the rotor, which chamber is divided into a forward-flow chamber and a return-flow chamber by a blade fixed to the rotor. A pressurization with hydraulic medium of either the forward-flow or return-flow chambers leads to a pivoting of the rotor relative to the stator. In this way, the phase position of the camshaft relative to the crankshaft can be adjusted.

The pressurization of either the forward-flow or the return-flow chamber is controlled via a directional control valve, which can be arranged in the feed line or centrally on the camshaft. To control the flow of pressure medium, the directional control valve comprises a control piston, the axial position of which allows either an inflow from the pressure medium pump to the forward-flow chamber or to the return-flow chamber. Draining of the other chamber is also released via the control piston. The axial position of the control piston is adjusted via the electromagnet.

DETAILED DESCRIPTION

Figure 1:
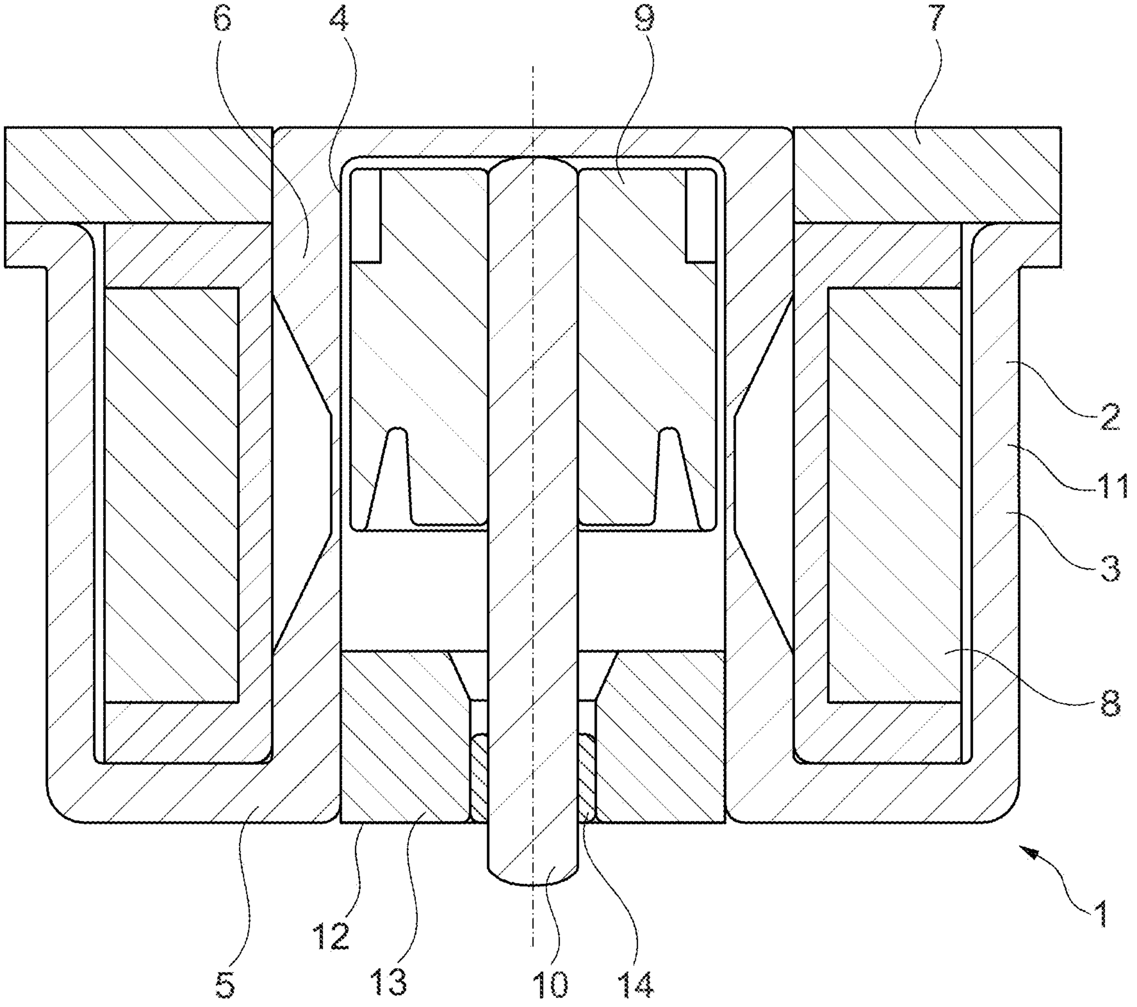
FIG. 1 shows an embodiment of the electromagnetic actuating device.

An embodiment of the electromagnet or the electromagnetic actuating device 1 is shown in FIG. 1. The actuating device includes a pot-shaped component 2, which can be produced from a workpiece by means of a forming process. The pot-shaped component 2 is integrally formed and comprises an electromagnet casing 3, a bearing sleeve 4, a pole core 5 and a yoke 6. The yoke 6 is formed directly on the outer diameter of the bearing sleeve 4 so that the pot-shaped component 2 is closed off at one end by means of a yoke plate 7.

The pot-shaped component 2 also forms a housing 11 in which components can be accommodated. The coil 8 is located in an outer hollow space. An armature 9 supporting an actuating pin 10 is arranged in the central hollow space. A bearing unit 12 forms an interference fit with the housing 11, with the actuating pin 10 protruding through the bearing unit 12. The bearing unit 12 comprises a bearing support 13 and a sliding bearing sleeve 14.

Figure 2:
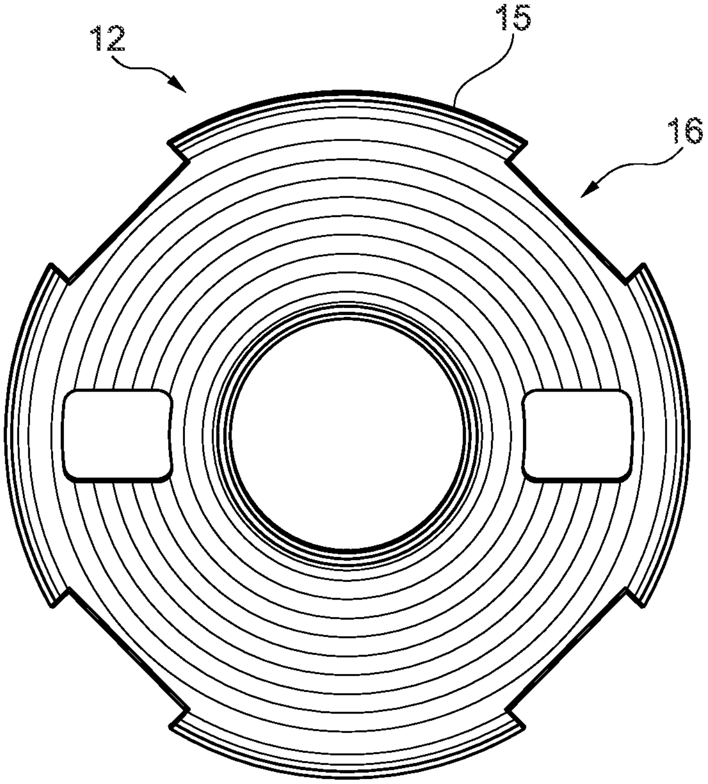
FIG. 2 shows a first embodiment of the bearing unit.

FIG. 2 shows an embodiment of the bearing unit 12 from FIG. 1. Recesses 16 are arranged on the outer circumference 15 (or an outer round surface) of the bearing unit 12. The recesses 16 are realized by reducing the outer circumference 15 of the bearing unit 12 in certain areas. A total of four recesses 16 are arranged along the circumference 15, but a larger or smaller quantity can also be provided. As an alternative to the embodiment shown, the bearing unit 12 can also have a constant outer circumference 15, wherein the recesses 16 are produced by openings in the vicinity of the outer circumference 15.

Figure 3:
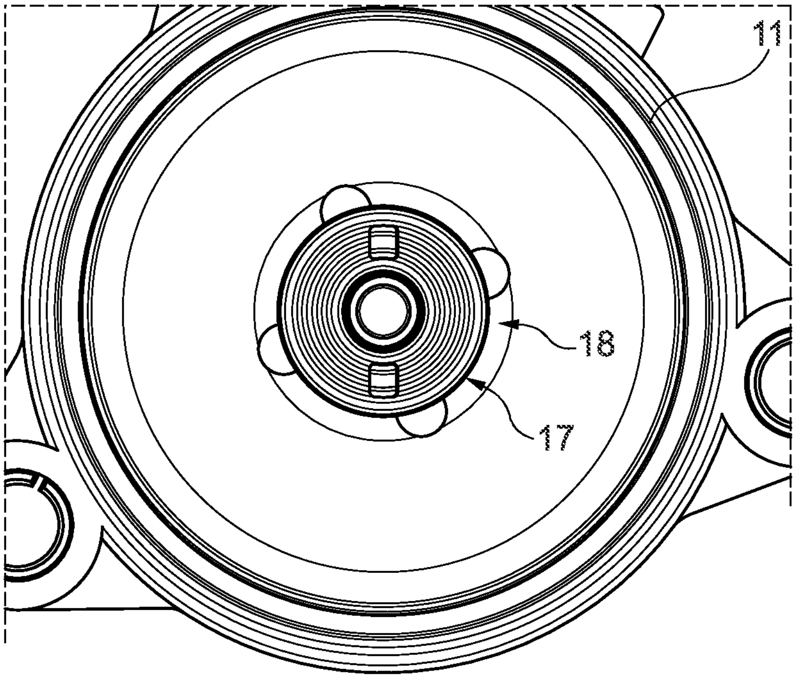
FIG. 3 shows an alternative embodiment of the housing of FIG. 1 or FIG. 2.

An alternative embodiment is shown in FIG. 3, in which four recesses 18 are arranged on the inner circumference 17 (or an inner round surface) of the housing 11. The recesses 18 are produced by extending the inner diameter of the inner circumference 17 in sections. Alternatively, the diameter of the inner circumference 17 can also remain constant in this case, wherein the recesses are produced by openings which are located in the vicinity of the inner circumference 17.

The recesses 16, 18 described in the previous exemplary embodiments make it possible to increase the elasticity of the press-fit connection. In this way, a secure press-fit connection between the bearing unit 12 and the accommodating component can be ensured.

LIST OF REFERENCE SYMBOLS

1 Actuating device
2 Pot-shaped component
3 Electromagnet casing
4 Bearing sleeve
5 Pole core
6 Yoke
7 Yoke plate
8 Coil
9 Armature
10 Actuating pin
11 Housing
12 Bearing unit
13 Bearing support
14 Sliding bearing sleeve
15 Outer circumference
16 Recesses
17 Inner circumference
18 Recesses

The invention claimed is:

1. An electromagnetic actuating device for a hydraulic camshaft adjuster, comprising:
- a housing
- a yoke,
- a pole core,
- an armature,
- an actuating pin, and
- a bearing unit;
- the actuating pin is led out of the housing via the bearing unit, and;
- a first round surface of the bearing unit forms a press-fit connection with a second round surface of one of the housing or with a component connected to the housing,
- wherein a recess is arranged on the first round surface of the bearing unit so as to increase an elasticity of the press-fit connection, the recess extending radially inwardly from the first round surface.

2. The electromagnetic actuating device according to claim 1, wherein the recess is a reduction in sections of a diameter of the first round surface.

3. The electromagnetic actuating device according to claim 1, wherein a diameter of the first round surface remains constant.

4. The electromagnetic actuating device of claim 1, wherein the first round surface is an outer circumference of the bearing unit.

5. An electromagnetic actuating device for a hydraulic camshaft adjuster, comprising:
- a housing,
- a coil disposed within the housing,
- an armature disposed within the coil,
- a bearing unit disposed within an end of the housing via a press-fit connection,
- an actuating pin:
  - configured to be axially actuated by the armature,
  - disposed within and slidably guided by the bearing unit,
  - extending outside of the housing from the bearing unit,
- wherein the press-fit connection:
  - is defined by a first round surface of the bearing unit and a second round surface of one of the housing or a separate component attached to the housing, and
  - the first round surface includes circumferentially arranged recesses that extend radially inwardly from the first round surface, the circumferentially arranged recesses configured to increase an elasticity of the press-fit connection.

6. The electromagnetic actuating device of claim 5, wherein the circumferentially arranged recesses are a reduction in sections of a diameter of the first round surface.

7. The electromagnetic actuating device of claim 5, further comprising a yoke and a pole core.

8. The electromagnetic actuating device of claim 5, wherein the first round surface is an outer circumference of the bearing unit.

* * * * *